July 7, 1964 S. K. STAUTH 3,139,968
ELEVATING CONVEYOR WITH SLIDE-PIPE HOLD DOWN ATTACHMENT
Filed Aug. 10, 1961
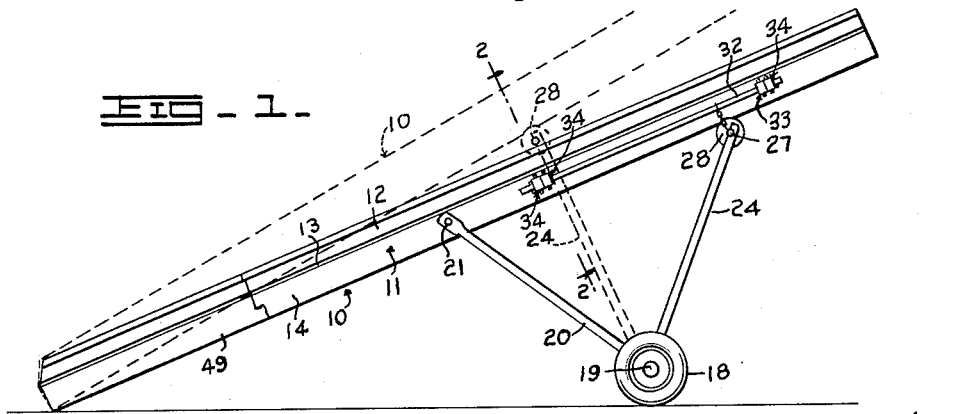
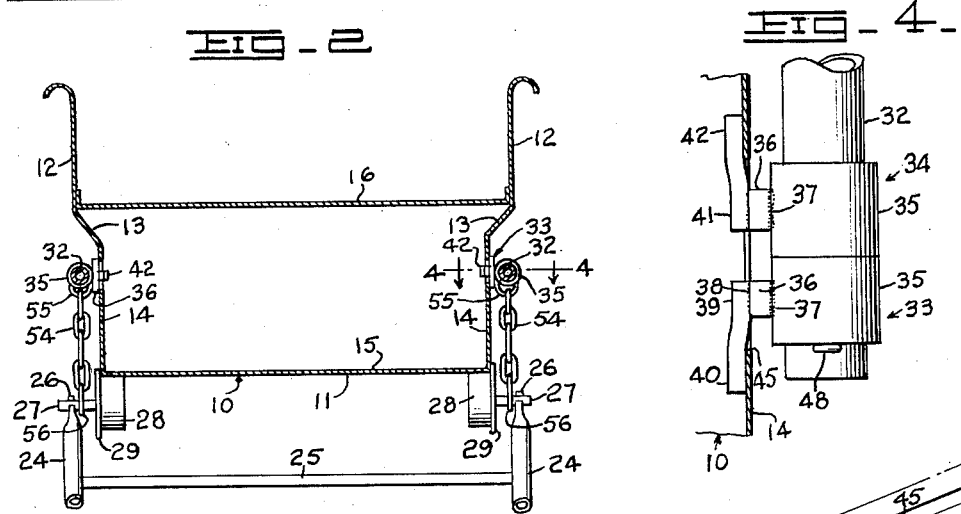
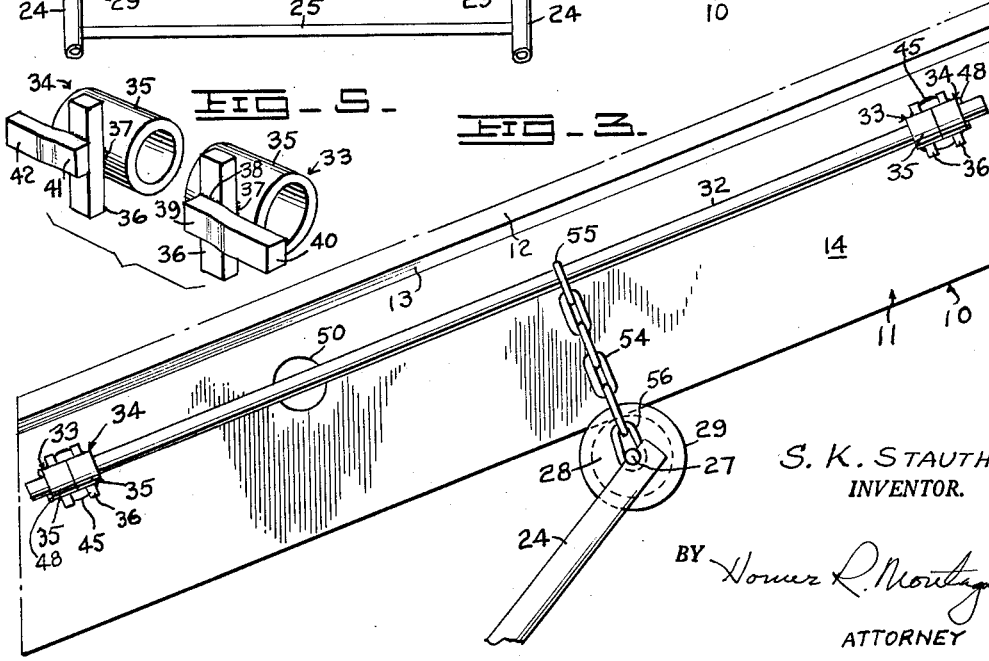
S. K. STAUTH,
INVENTOR.
BY
ATTORNEY United States Patent Office 3,139,968
Patented July 7, 1964

3,139,968
ELEVATING CONVEYOR WITH SLIDE-PIPE
HOLD DOWN ATTACHMENT
Samuel K. Stauth, Compton, Ill., assignor to Mayrath
Machinery Co., Inc., a corporation of Kansas
Filed Aug. 10, 1961, Ser. No. 130,679
4 Claims. (Cl. 198—120.5)

This invention relates to corn and hay elevators and novel conveying means, and has particular reference to a novel attachment for such a mechanism.

It is the common practice in portable conveyors or elevators of the type referred to, to employ a conveyor, frequently having an open trough, upwardly through which materials are conveyed, and to support such conveyor on wheels connected to the conveyor in such a way as not only to support the conveyor but also to adjust the angle of the trough to the horizontal according to the desired height of the discharge end of the conveyor. The means for supporting the conveyor relative to the wheels referred to comprises radius rods pivotally connected at opposite ends to the conveyor and to the axle of the wheels, and supporting arms connected to the wheel axle and having rollers or other means engaging the body of the conveyor such as the trough thereof. The supporting arms usually extend upwardly at an angle to the vertical and the inclination of the conveyor is adjusted by winch and cable means for pulling or releasing the upper ends of the supporting arms to vary the angle of the latter to the vertical, and thus change the inclination of the conveyor to the horizontal. Where rollers are employed at the upper ends of the supporting arms, engageable with the conveyor trough, the rollers are provided with flanges outwardly of the trough to guide the latter in its movement relative to the wheels. Such conveyor is usually portable, as stated, and in moving the conveyor from place to place, the trough sometimes "jumps" out of engagement with the rollers carried by the upper ends of the supporting arms, and this, of course, is highly disadvantageous.

In the use of such conveyor structures, it is desired to limit both the minimum and maximum angle of the supporting arms relative to the conveyor. If such angle is too small, the supporting arms and radius rods are arranged too closely to a common plane, and the weight of the conveyor places too much strain on these elements. Conversely, if the supporting arms reach and slightly pass a position perpendicular to the length of the conveyor, the rollers of the supporting arms will roll downwardly along the trough, thus collapsing the supporting structure for the conveyor and causing damage to the mechanism.

An important object of the present invention is to provide novel means in the form of an attachment for a conveyor of the type referred to which acts as a hold-down for the conveyor trough to prevent it from jumping out of engagement with the rollers under any conditions, for example, when the conveyor is being moved from place to place.

A further object is to provide such a device which acts to limit the minimum and maximum angles of the conveyor supporting arms, which is highly desirable for the reasons given above.

A further object is to provide means of the type referred to which acts both as a hold-down to prevent the conveyor from jumping out of engagement with the rollers of the supporting arms, and which automatically operates at all times to limit the minimum and maximum angles of the supporting arms, as described above.

A further object is to provide such a device in the form of a rod or pipe along each side of the conveyor connected to the spindles of the supporting arm rollers to act as a hold-down to maintain the conveyor in engagement with such rollers, and to provide novel means for attaching such pipes or rods to the conveyor to support the pipes or rods in proper position and also to act as means for limiting minimum and maximum angles of the supporting arms to the length of the conveyor.

A further object is to provide novel means for fixing the pipe or rod attaching means to a conveyor trough or the like and to each pipe or rod in such a way that the attaching means requires no fastening elements or means, such as bolts, rivets or welding, and wherein the pipes or rods serve to maintain the attaching means in fixed engagement with the conveyor trough or the like.

Other objects and advantages of the invention will become apparent during the course of the following description.

In the drawing I have shown one embodiment of the invention. In this showing,

FIGURE 1 is a side elevation of a trough type conveyor showing the invention applied;

FIGURE 2 is an enlarged section on line 2—2 of FIGURE 1;

FIGURE 3 is an enlarged fragmentary side elevation of a portion of the conveyor showing the invention applied;

FIGURE 4 is a greatly enlarged detailed sectional view on line 4—4 of FIGURE 2, and FIGURE 5 is a detail perspective view of two of the rod attaching elements.

Referring to FIGURE 1, the numeral 10 designates as a whole a conventional conveyor or elevator of the type commonly employed for conveying or elevating corn and hay. The conveyor is generally indicated as comprising a trough 11 in which is operable a power driven endless conveying means (not shown). The cross-sectional shape of the conventional trough is shown in FIGURE 2 and comprises side walls 12 having portions converging downwardly as at 13, the lower sidewall portions 14 having a bottom wall or pan 15 over which the lower run of the conveying means operates. Between the sidewalls 12 is connected an upper pan 16 over which the upper runs of the conveying means operate to move materials or articles from the lower end of the conveyor in FIGURE 1 for discharge from the upper end thereof.

The conveyor is conventionally supported by wheels 18 having an axle 19 connected therebetween. Upwardly and forwardly converging conventional radius rods 20 are pivotally conected at their lower ends to the axle 19 and at their upper forward ends they are connected as at 21 to the trough 11.

A pair of upwardly and rearwardly converging supporting arms 24 are connected at their lower ends to the axle 19. The upper ends of the arms 24 may be suitably cross braced as at 25 and the upper extremity of the arms 24 are flattened as at 26 and have welded thereto spindles 27 each supporting a roller 28, preferably surrounded by a rubber band and having flanges 29. As will be clear from FIGURE 2, the rubber covered portions of the rollers 28 support the conveyor trough, and the wheel flanges 29 guide the trough to maintain it in proper engagement with the rollers 28.

The present invention comprises an elongated member 32 in the form of a rod or pipe, and preferably pipe, arranged at each side of the conveyor trough outwardly of the wall portion 14 thereof. Each rod 32 is parallel to the bottom edge of the conveyor as clearly shown in FIGURE 3, and is fixed into position with respect to the adjacent sidewall portion 14 by novel means constituting an important feature of the present invention.

At each end of each pipe or rod 32 is arranged a pair of brackets respectively indicated as a whole by the numerals 33 and 34. Each of these brackets comprises a pipe section 35 having a vertically extending bar 36 welded thereto as at 37 so as to be tangential to the associated pipe section 35. These bars 36 are preferably rectangular in cross-section as clearly shown in FIGURES 4 and 5. To the bar 36 of the bracket 33 is welded at 38 a holding bar 39. This bar, as will become apparent, projects in one direction longitudinally of the conveyor trough and has a free end 40 slightly offset from the plane of the face of the bar 36 to which the bar 39 is welded. A similar bar 41 is welded to the bar 36 of the bracket 34 and has its end 42 slightly offset out of the plane of the face of its bar 36 to which the bar 41 is welded.

The bars 36 of each pair of brackets are slightly longer than the diameter of openings 45 formed in the sidewall portions 14 to which the brackets 33 and 34 and their pipes 32 are to be secured. The dstance between the free ends of the bars 39 and 41 (FIGURE 4) is substantially greater than the diameter of the associated opening 45. As further described below, the brackets 33 and 34 for one end of either rod or pipe 32 are inserted through an opening 45 separately by tilting them, inserting the ends 40 and 42 through the opening 45, then similarly placing the brackets for the other end of the rod 32 in position, then aligning the pipe sections 35 and inserting the pipe or rod 32 therethrough. Two sets of brackets are shown in FIGURE 3 and it will be apparent that when the pipe 32 is inserted therethrough, the brackets cannot become disconnected from the conveyor trough.

Each pipe 32 extends slightly beyond its pairs of brackets 33 and 34, and beyond the remote brackets of such pairs, cotter pins 48 extend through the pipe 32 to prevent sliding movement thereof in either direction. It will be apparent that conveyors of this type may be provided with longitudinal extensions, such as the extension 49 in FIGURE 1, and for the purpose of properly supporting any length conveyor, the connecting points 21 of the radius rods may be at different points along the conveyor and this is true also of the position of the brackets 33 and 34. To this end, the sidewalls 14 may be provided with several bracket-receiving openings, one of which is indicated by the numeral 50 in FIGURE 3.

Each pipe 32 is connected to the adjacent axle spindle 27 by a chain 54 or other flexible element. The upper end of each such chain is in the form of an enlarged link 55 surrounding and readily slidable along the pipe 52. The lower end of each chain is in the form of a link 56 surrounding the adjacent spindle 27 between the associated roller 28 and arm 24 as shown in FIGURE 2.

*Operation*

The bracket elements 33 and 34 are first assembled into position at each side of the conveyor prior to the placing in position of the associated pipes or rods 32. It will be noted that the elements 33 and 34 of each pair have their arm ends 40 and 42 projecting in opposite directions. In positioning the bracket elements, one of them will be placed in position with the arm 39 opposite the opening 45 and moved inwardly and then endwise to position the end of the arm 40 behind the wall portion 45 as shown in FIGURE 4. The bracket element thus inserted will be pushed endwise as far as possible. The other bracket element will then be tilted, that is, rocked counter-clockwise from the position shown in FIGURE 4, whereupon the arm end 42 will be inserted through the opening 45. The bracket element thus inserted will then be rocked back to a position with its sleeve or pipe section 45 in axial alignment with the similar portion of the bracket element which was inserted first. The other bracket elements for the associated pipe 32 are similarly placed in position. After this is done, the pipe sections 35 of both pairs of brackets elements at one side of the conveyor will be axially aligned, whereupon the pipe or rod 32 will be slipped through the pipe sections of both pairs of bracket elements. The pipe or rod 32 and associated bracket elements will assume the proper positions shown in FIGURE 3, and the cotter pins 48 will be inserted through openings drilled in the proper position in the pipe 32.

The parts at the opposite side of the conveyor are similarly assembled and it will be understood that the chains 54 or other hold-down flexible elements will be mounted on the rods 32 when inserting them through the brackets. In other words, at each side of the conveyor, the left hand end of the rod 32 in FIGURE 3, for example, will be slipped through the upper pair of bracket elements, and the chain loop 55 will be placed into position over the left hand end of the rod 32, whereupon such rod is inserted through the lower or left hand bracket elements 33 and 34. With the rollers 28 removed, the lower chain loop 56 at each side of the conveyor will be placed over the associated axle spindles 27, whereupon the rollers will be placed into position on the axle spindles.

It will be apparent that when the bracket elements 33 and 34 are placed into position, they support the two rods 32 at the side of the conveyor. Conversely, the rods 32 prevent any rocking movement of the bracket elements by keeping the pipe sections 35 thereof in axial alignment. Therefore, these pipe sections can partake of no rocking movement as is necessary for their removal from the opening 45. Accordingly, the bracket elements will be effectively locked in position without the use of any fastening means, such as bolts, rivets or welding. It also will be apparent that if it is desired to remove either pipe and its associated bracket elements, it merely is necessary to remove one of the cotter pins 48, slide the pipe lengthwise toward its other end to remove it from engagement with both of its associated pairs of bracket elements, whereupon the bracket elements may be removed by reversing the procedure by which they were inserted.

The rods 32 provide easily attachable means for use with a conveyor and these rods and their associated bracket elements serve two highly useful purposes. The connection of the rods 32 to the axle spindles 27 prevents any movement of the trough upwardly in the plane of the chains 54 or other flexible hold-down means. Thus, in transporting the conveyor, particularly over rough ground, the hold-down means serves effectively to prevent the conveyors from becoming dislodged from their proper positions with respect to the rollers 28. This is one of the important functions of the present device.

As previously stated, it is desired to limit the minimum and maximum angles between the radius rods 20 and supporting arms 24. If this angle too closely approaches 180 degrees, too great a strain is placed on the radius rods and supporting arms, it being desired that a substantial proportion of the load be imposed on these elements as resultant forces acting endwise thereof. Such forces are progressively reduced as the angle between the radius rods and supporting arms increases. With the present device properly located, engagement of the chain loop 55 with the upper bracket element 33 (FIGURE 3) prevents any further upward movement of the rollers 28 along the bottom of the conveyor trough and thus the maximum angle between the radius rods and supporting arms is limited.

Similarly, the lower or left hand bracket elements 33 and 34 limit movement of the loops 55 downwardly along the rods 32. Such lower bracket elements are preferably positioned so that the supporting arms cannot pass a position perpendicular to the length of the conveyor trough. This position is reached as shown in dotted lines in FIGURE 1, and under such conditions, the conveyor 10 is tilted at its maximum angle to the horizontal. If the supporting arms 24 were free to move further, they would collapse over the radius rods 20 and the mechanism would be subject to substantial damage.

It will be understood that winch and cable means are employed for exerting a pull on the supporting arms 24 to swing them upwardly to tilt the conveyor at a greater angle to the horizontal. The same means may be unwound to permit the arms 24 to swing clockwise about the axle 19 when it is desired to decrease the angle of the conveyor to the horizontal. Inasmuch as the means referred to is conventional and forms no part of the present invention, it has not been illustrated. It also will be understood that conventional means in the form of a suitable motor or engine and its driving connections will be employed for operating the conveyor. Such means also has not been shown since it forms no part of the present invention.

The form of the invention shown and described is to be taken as a preferred example of the same, and various changes in the shape, size and arrangement of the parts may be made as do not depart from the spirit of the invention or the scope of the appended claims.

What is claimed is:

1. In a conveying mechanism, an elongated conveyor body, a wheeled axle structure, radius rods connected between said axle structure and said conveyor body, supporting arms connected to said axle structure and diverging upwardly from said radius rods, conveyor-body engaging means carried by said arms for supporting said conveyor body and for providing for endwise movement thereof relative to said supporting arms to vary the inclination of said conveyor body from the horizontal as said supporting arms are moved to vary their angle relative to said radius rods, smooth elongated rod-like members carried by said conveyor body along opposite sides thereof substantially above said conveyor-body engaging means, and means slidable along said elongated members and having mechanical connection with said supporting arms to maintain said conveyor body in engagement with said engaging means in any angularly adjusted position of said supporting arms.

2. A conveyor mechanism according to claim 1 in which the sides of said conveyor body are provided with spaced openings, and bracket devices engaging and supporting said rod-like members, said bracket devices being engaged in the respective spaced openings and being maintained in position therein by engagement of said bracket devices with said rod-like members.

3. A conveying mechanism in accordance with claim 2, in which each of said bracket devices comprises a pair of bracket elements having cylindrical portions in end to end engaging relationship and each having a bar engaging flat against the adjacent conveyor sidewall, the cylindrical portions of each pair of bracket elements having bars projecting in opposite directions therefrom inwardly of the adjacent sidewall of said body and having their remote ends spaced apart greater than the diameter of the associated opening; whereby, when one of said longitudinally extending rods is inserted into the cylindrical portions of one pair of bracket elements, the bracket means are fixed to said conveyor sidewall and cannot be removed until such longitudinally extending rod is removed from said cylindrical portions to permit said bracket elements to be rocked out of the associated opening.

4. A conveying mechanism according to claim 1 wherein said supporting arms diverge upwardly from a plane perpendicular to said conveyor body, a pair of brackets connected to each side of said conveyor body and supporting said rod-like members, one bracket of each pair being so positioned along said conveyor body as to engage said slidable means and prevent swinging movement of said supporting arms beyond said plane.

References Cited in the file of this patent

UNITED STATES PATENTS 2,592,480    Slocum _____ Apr. 8, 1952
2,598,470    Vutz _____ May 27, 1952